US008493721B2

(12) United States Patent
Wu

(10) Patent No.: US 8,493,721 B2
(45) Date of Patent: Jul. 23, 2013

(54) FIXING MECHANISM AND COMPUTER THEREWITH

(75) Inventor: Jing-Tang Wu, New Taipei (TW)

(73) Assignee: Wistron Corporation, Xizhi Dist., New Taipei (TW)

(*) Notice: Subject to any disclaimer, the term of this patent is extended or adjusted under 35 U.S.C. 154(b) by 32 days.

(21) Appl. No.: 13/372,502

(22) Filed: Feb. 14, 2012

(65) Prior Publication Data

US 2012/0287567 A1 Nov. 15, 2012

(30) Foreign Application Priority Data

May 13, 2011 (TW) .............................. 100116807 A

(51) Int. Cl.
*H05K 5/00* (2006.01)
*H05K 7/00* (2006.01)
*G06F 1/16* (2006.01)

(52) U.S. Cl.
USPC ............ 361/679.02; 361/679.01; 361/679.31; 361/679.33; 361/679.6; 312/223.1; 312/223.2

(58) Field of Classification Search
USPC ............... 361/79.01, 679.02, 679.31, 679.33, 361/679.6; 312/223.1, 223.2
See application file for complete search history.

(56) References Cited

U.S. PATENT DOCUMENTS

| 5,748,442 | A  | * | 5/1998  | Toor ......................... 361/679.31 |
| 5,940,265 | A  | * | 8/1999  | Ho ............................ 361/679.31 |
| 6,478,390 | B2 | * | 11/2002 | Gan .......................... 312/223.2 |
| 7,495,908 | B2 | * | 2/2009  | Zhang et al. ............. 361/679.33 |
| 7,542,271 | B2 | * | 6/2009  | Chen et al. ............... 361/679.33 |
| 7,580,252 | B2 | * | 8/2009  | Wu et al. .................. 361/679.33 |
| 7,839,633 | B2 | * | 11/2010 | Chou ......................... 361/679.6 |
| 2007/0109738 | A1 | * | 5/2007 | Lin ................................ 361/685 |

* cited by examiner

*Primary Examiner* — Anthony Haughton
(74) *Attorney, Agent, or Firm* — Winston Hsu; Scott Margo

(57) ABSTRACT

A fixing mechanism includes a base whereon at least one buckling portion is formed. The fixing mechanism further includes a bracket connected to an electronic module. The bracket includes a bottom plate, at least one lateral plate connected to the bottom plate and being buckled inside the buckling portion, and a baffle connected to the bottom plate. The fixing mechanism further includes a cover portion including a board, at least one hook connected to a side of the board for hooking the base, a constraining portion connected to the side of the board for laterally constraining the at least one lateral plate, and a resilient structure connected to the constraining portion for contacting against the baffle of the bracket so as to support the electronic module resiliently.

10 Claims, 6 Drawing Sheets

FIXING MECHANISM AND COMPUTER THEREWITH

BACKGROUND OF THE INVENTION

1. Field of the Invention

The present invention relates to a fixing mechanism, and more specifically, to a fixing mechanism capable of providing resilient cushion and shockproof functions for an electronic module.

2. Description of the Prior Art

An optical disk drive is a key component of a notebook computer and is for reading data stored in optical disks. The optical disk drive might fail to read data stored in optical disks as being pressed by external force. Recently, the notebook computer trends to lightweight and thin size, and a gap between the optical disk drive and a palm rest gets smaller. Most casing of the notebook computer is made of plastic material whose lower strength than one of the metal material, and the optical disk drive might fail to read data stored in optical disks as the plastic casing is pressed by large external force. For solving the above-mentioned problem, an enough gap is needed to be formed between the optical disk drive and the casing so as to increase the thickness of the notebook computer. Furthermore, the optical disk drive is often screwed on the casing and supported by ribs on a bottom, so the pressure is entirely applied on the optical disk drive as the optical disk drive is pressed downward by the external force. Hence, it is an important issue for a fixing mechanism for fixing the optical disk drive and capable of saving mechanical space and effectively providing a shockproof function in computer industry.

SUMMARY OF THE INVENTION

The present invention provides a fixing mechanism capable of providing resilient cushion and shockproof functions for an electronic module, to solve the problems mentioned above.

According to the claimed invention, a fixing mechanism for fixing an electronic module includes a base whereon at least one buckling portion is formed, and a bracket connected to the electronic module. The bracket includes a bottom plate fixed on a side of the electronic module, at least one lateral plate connected to the bottom plate and being buckled inside the buckling portion as the bracket is installed on the base, and a baffle connected to the bottom plate. The fixing mechanism further includes a cover portion installed on the base. The cover portion includes a board, at least one hook connected to a side of the board for hooking the base, a constraining portion connected to the side of the board for laterally constraining the at least one lateral plate, and a resilient structure connected to the constraining portion for contacting against the baffle of the bracket so as to support the electronic module resiliently.

According to the claimed invention, at least one hook structure is formed on an end of the at least one lateral plate for hooking the buckling portion.

According to the claimed invention, the fixing mechanism further includes a screwing component for screwing the bottom plate of the bracket on the side of the electronic module.

According to the claimed invention, a buffer space is formed between the resilient structure and the board for allowing movement of the resilient structure pressed by the baffle.

According to the claimed invention, the cover portion further includes an arc pad connected to another side of the board for supporting the base.

According to the claimed invention, a computer device includes an electronic module and a fixing mechanism for fixing the electronic module. The fixing mechanism includes a base whereon at least one buckling portion is formed, and a bracket connected to the electronic module. The bracket includes a bottom plate fixed on a side of the electronic module, at least one lateral plate connected to the bottom plate and being buckled inside the buckling portion as the bracket is installed on the base, and a baffle connected to the bottom plate. The fixing mechanism further includes a cover portion installed on the base. The cover portion includes a board, at least one hook connected to a side of the board for hooking the base, a constraining portion connected to the side of the board for laterally constraining the at least one lateral plate, and a resilient structure connected to the constraining portion for contacting against the baffle of the bracket so as to support the electronic module resiliently.

The fixing mechanism of the present invention utilizes the resilient structure of the cover portion to resiliently support the bracket connected to the electronic module so as to provide resilient cushion for the electronic module. The fixing mechanism of the present invention can provide the electronic module, such as an optical disk drive, with a preferred shockproof function within limited mechanical space.

These and other objectives of the present invention will no doubt become obvious to those of ordinary skill in the art after reading the following detailed description of the embodiment that is illustrated in the various figures and drawings.

DETAILED DESCRIPTION

Figure 1:
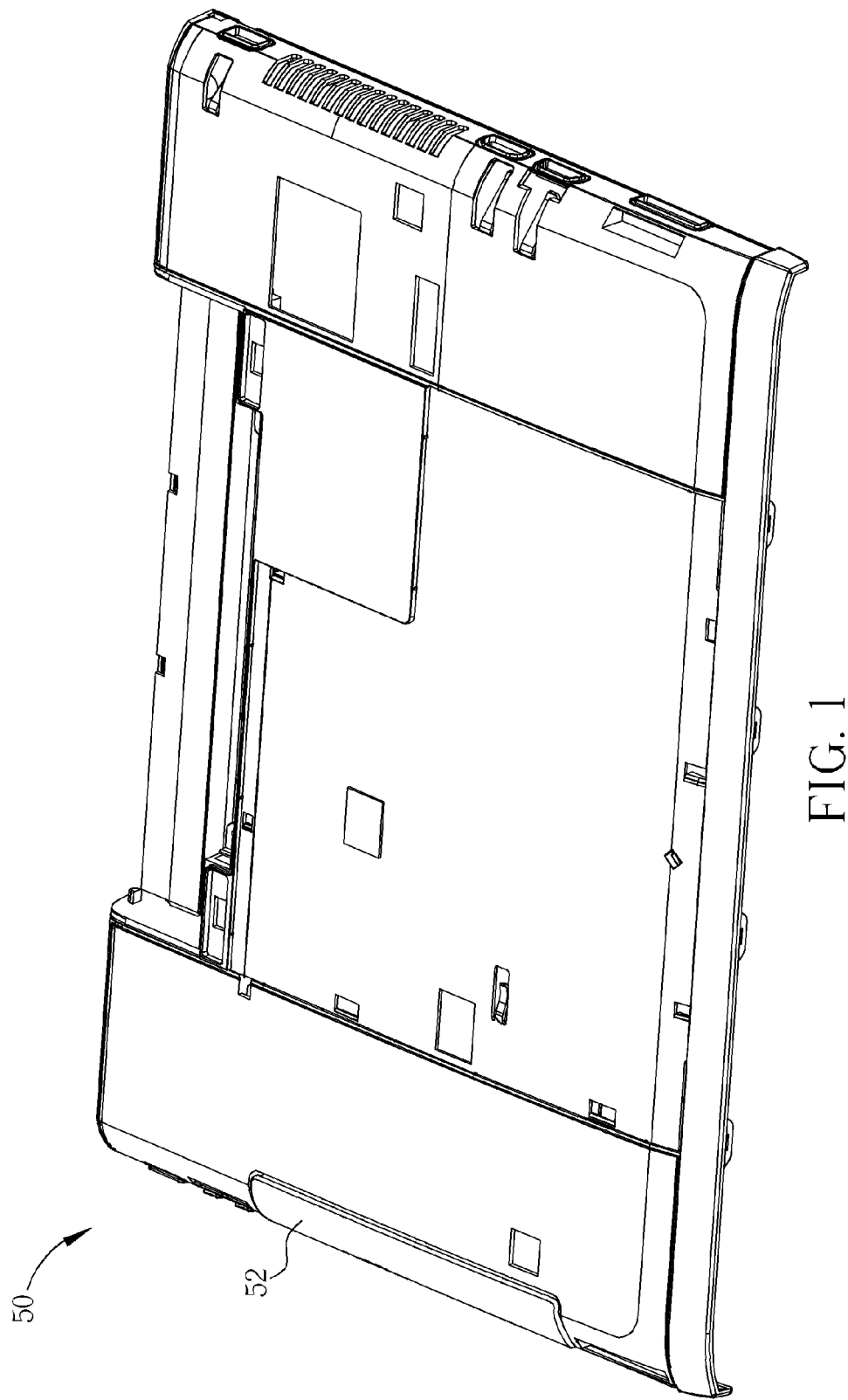
FIG. 1 and FIG. 2 are partial structural diagrams of a computer device in different views according to an embodiment of the present invention.
Figure 2:
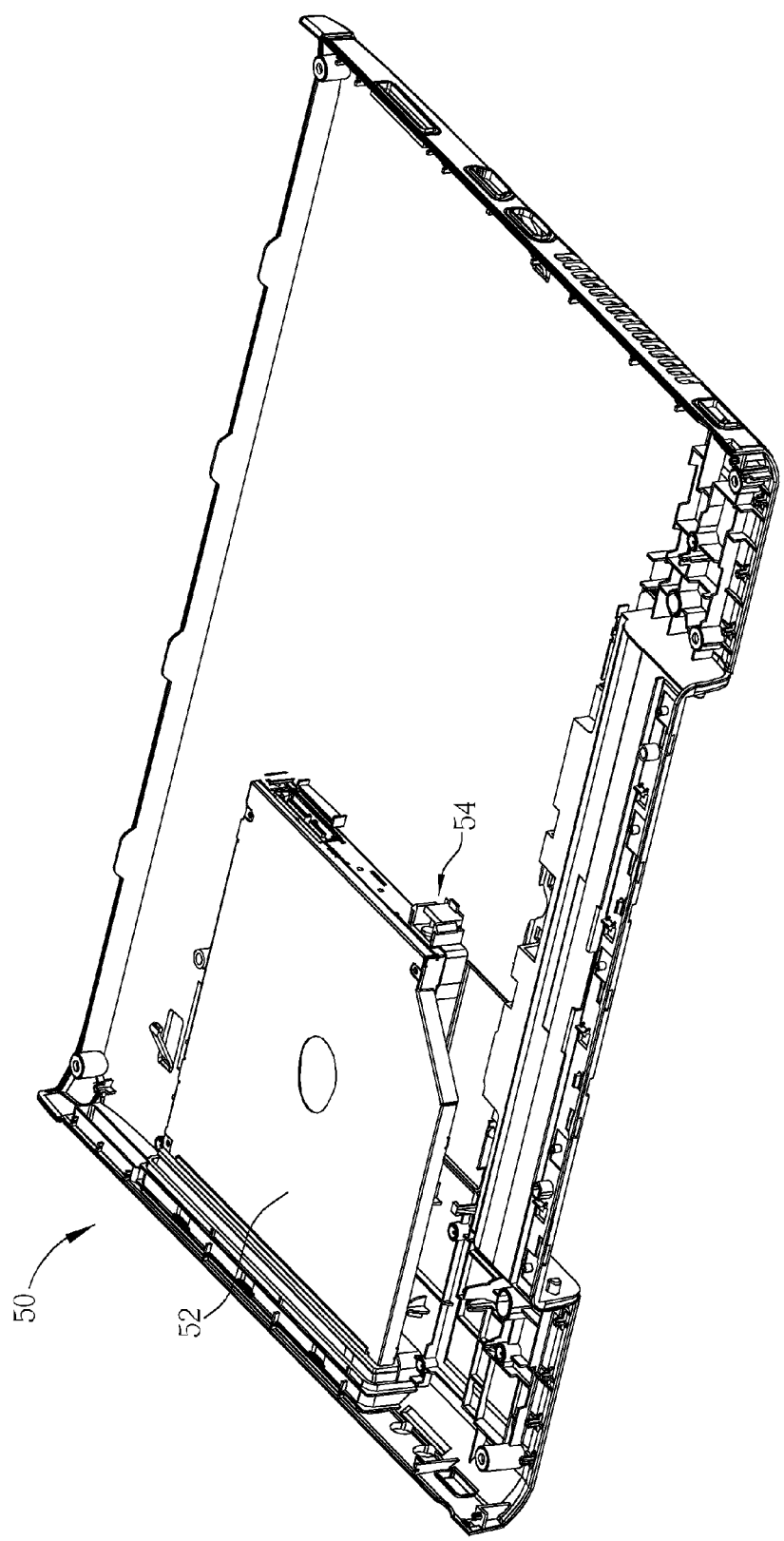
Figure 3:
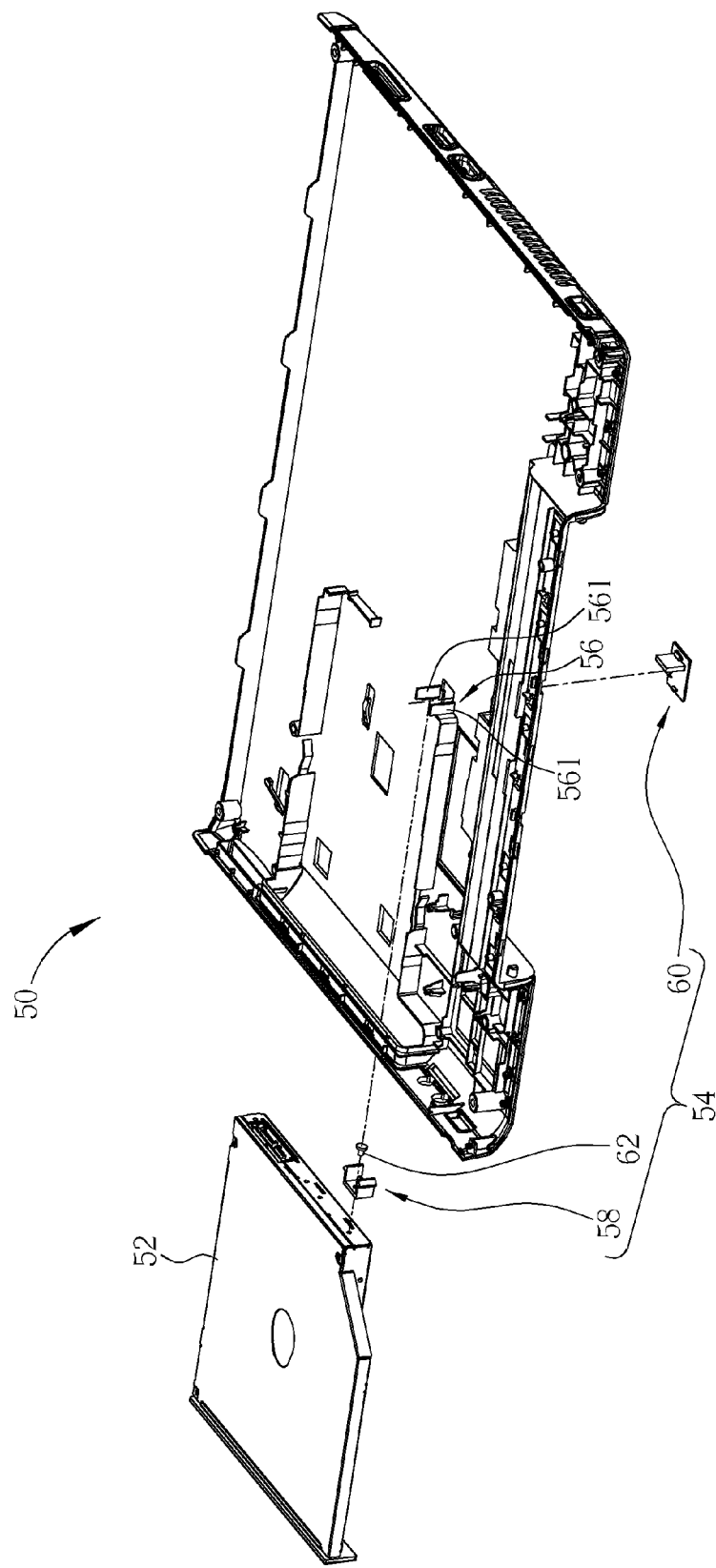
FIG. 3 is a partial exploded diagram of the computer device according to the embodiment of the present invention.
Figure 4:
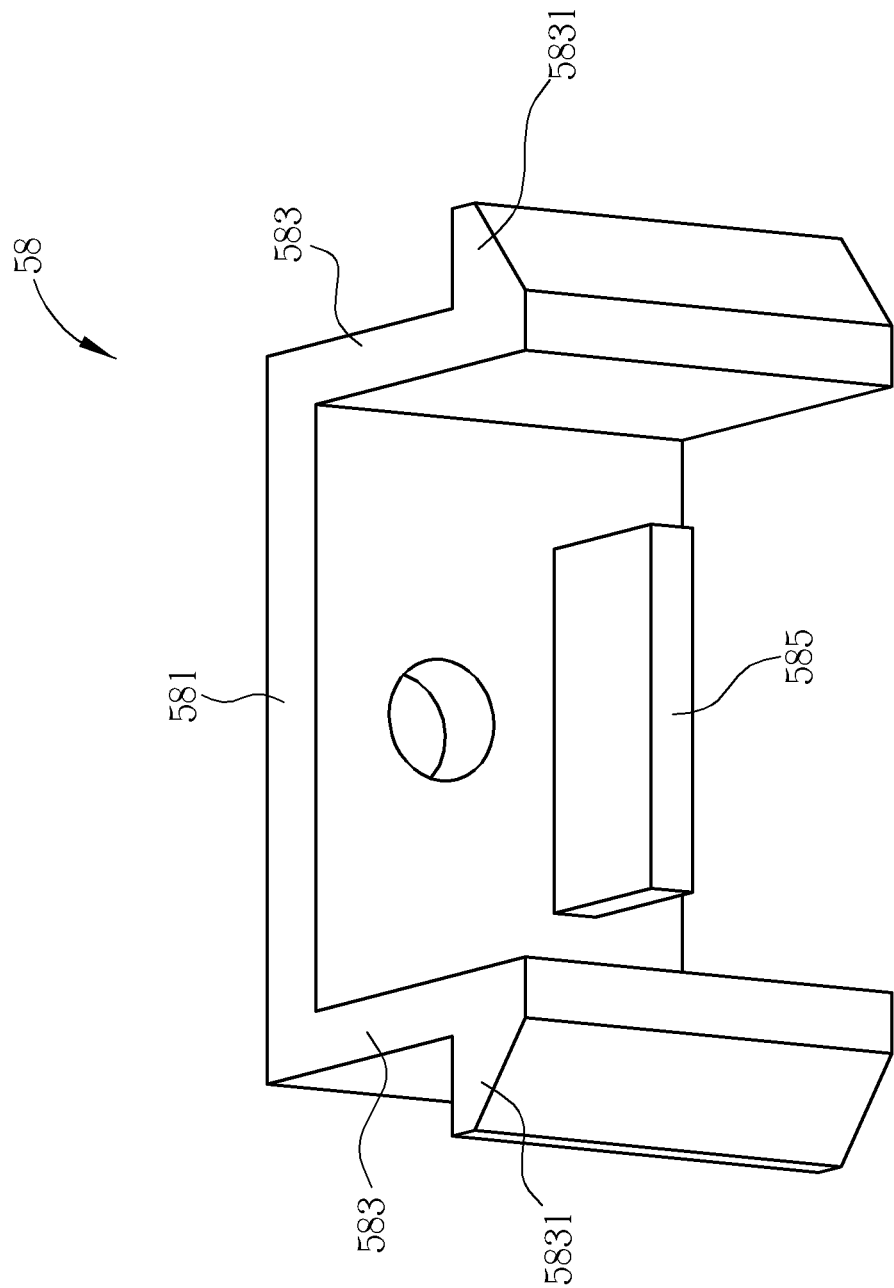
FIG. 4 is a diagram of a bracket according to the embodiment of the present invention.
Figure 5:
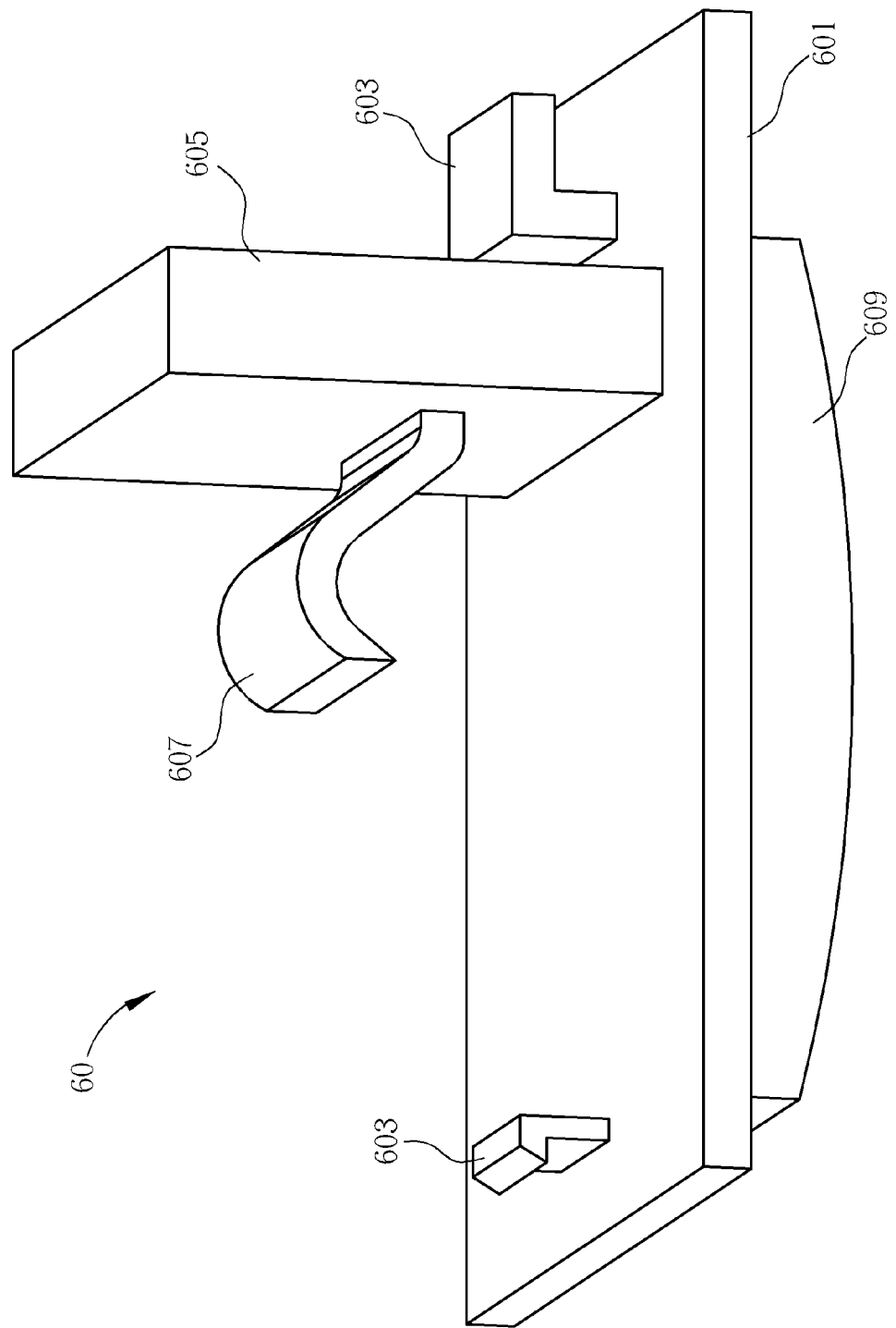
FIG. 5 is a diagram of a cover portion according to the embodiment of the present invention.
Figure 6:
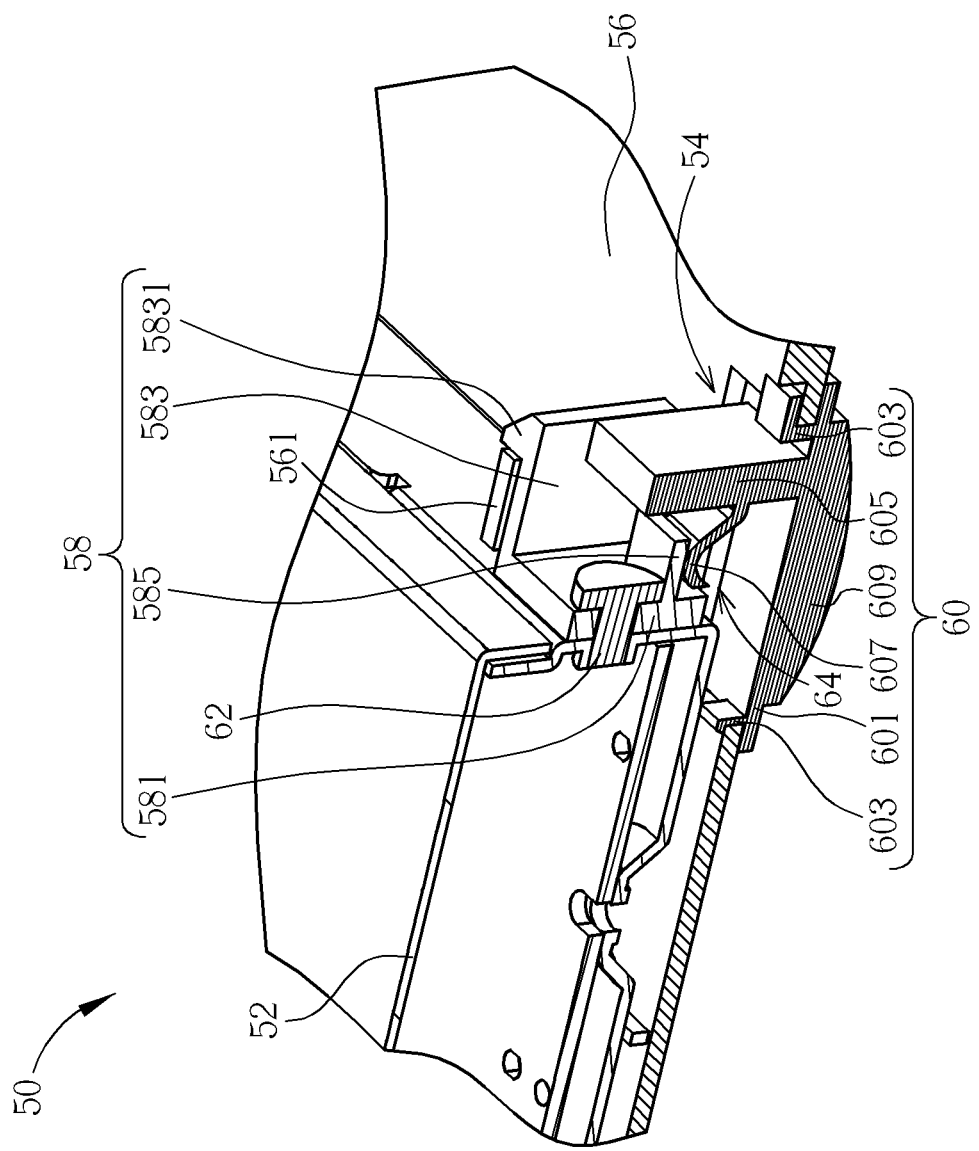
FIG. 6 is a partial sectional diagram of a fixing mechanism according to the embodiment of the present invention.

Please refer to FIG. 1 and FIG. 2. FIG. 1 and FIG. 2 are partial structural diagrams of a computer device 50 in different views according to an embodiment of the present invention. The computer device 50 can be a notebook computer, and so on. The computer device 50 includes an electronic module 52 detachably installed inside a casing of the computer device 50. The electronic module 52 can be a storage module, such as a disk drive, like an optical disk drive, a hard disk drive, and so on. Please refer to FIG. 1 to FIG. 3. FIG. 3 is a partial exploded diagram of the computer device 50 according to the embodiment of the present invention. The computer device 50 further includes a fixing mechanism 54 for fixing the electronic module 52. The fixing mechanism 54 includes a base 56, at least one bracket 58, at least one cover portion 60, and at least one screwing component 62. Please refer to FIG. 1 to FIG. 6. FIG. 4 is a diagram of the bracket 58 according to the embodiment of the present invention. FIG. 5 is a diagram of the cover portion 60 according to the embodiment of the present invention. FIG. 6 is a partial sectional diagram of the fixing mechanism 54 according to the embodiment of the present invention. At least one buckling portion 561 is formed on the base 56, the buckling portion 561 can be a rib structure, and a resilient hook can be formed on an end of the buckling portion 561. In this embodiment, there are two buckling portions 561 formed on the base 56. The disposal and amount of the buckling portion 561 are not limited to those of the embodiment, and it depends on actual design demand.

The bracket 58 is connected to the electronic module 52. The bracket 58 includes a bottom plate 581 fixed on a side of the electronic module 52. For example, the bottom plate 581 of the bracket 58 can be screwed on the side of the electronic module 52 by the screwing component 62, such as a screw. The bracket 58 further includes at least one lateral plate 583 connected to the bottom plate 581 and being buckled inside the buckling portion 561 as the bracket 58 is installed on the base 56. For example, the bracket 58 can have two lateral plates 583 respectively disposed on two ends of the bottom plate 581, and the two buckling portions 561 can respectively buckle the two lateral plates 583 as the bracket 58 is installed on the base 56. At least one hook structure 5831 is formed on an end of each lateral plate 583 for hooking the corresponding buckling portion 561 so as to fix the bracket 58 and the base 56. The bracket 58 further includes a baffle 585 connected to the bottom plate 581. The bottom plate 581, the lateral plate 583 and the baffle 585 can be integrated monolithically.

The cover portion 60 is detachably installed on the base 56. The cover portion 60 includes a board 601 and at least one hook 603 connected to a side of the board 601 for hooking the base 56 so that the cover portion 60 can be engaged with a bottom side of the base 56. The cover portion 60 further includes a constraining portion 605 connected to the side of the board 601 for laterally constraining the lateral plate 583 of the bracket 58. The cover portion 60 further includes a resilient structure 607 connected to the constraining portion 608 for contacting against the baffle 585 of the bracket 58 so as to support the electronic module 52 resiliently. The resilient structure 607 can be an arc clip structure. A buffer space 64 is formed between the resilient structure 607 and the board 601 for allowing movement of the resilient structure 607 pressed by the baffle 585. In addition, the cover portion 60 further selectively includes an arc pad 609 connected to another side of the board 601 for supporting the base 56. That is, the arc pad 609 is disposed on the bottom side of the base 56 for supporting the base 56 on a plane as the cover portion 60 is installed on the base 56.

As for assembly of the electronic module 52 inside the computer device 50, the bottom plate 581 of the bracket 58 can be screwed on the side of the electronic module 52 by the screwing component 62 first so as to fix the bracket 58 on the side of the electronic module 52. Then the assembly of the electronic module 52 and the bracket 58 can be disposed on the base 56. The lateral plate 583 of the bracket 58 can push the buckling portion 561 of the base 56 outwardly so as to deform the buckling portion 561 until an end of the lateral plate 583 contacts the base 56. Afterward, the buckling portion 561 resiliently recovers to an original position and buckles an upper side of the lateral plate 583. At the same time, the hook structure 5831 of the lateral plate 583 also hooks a lateral side of the buckling portion 561 so that the buckling portion 561 engages with the lateral plate 583, and the constraining portion 605 laterally constrains the lateral plate 583 of the bracket 58 so as to prevent the lateral plate 583 from separating from the buckling portion 561 as the computer device 50 falls down. When the bracket 58 is installed on the base 56 and engaged inside the buckling portion 261 and the cover portion 60 is fixed on the base 56, the resilient structure 607 contacts against the baffle 585 of the bracket 58 so as to support the electronic module 52 resiliently for providing resilient cushion and shockproof functions for the electronic module 52. The bracket 58 is supported by the resilient structure 607 of the cover portion 60, and the resilient structure 607 is resiliently deformed downward within the buffer space 64 as the electronic module 52 is applied with external force on the top. It can absorb the impact of the electronic module 52 so as to prevent an abnormal condition of failure in operation of the electronic module 52.

In contrast to the prior art, the fixing mechanism of the present invention utilizes the resilient structure of the cover portion to resiliently support the bracket connected to the electronic module so as to provide resilient cushion for the electronic module. The fixing mechanism of the present invention can provide the electronic module, such as an optical disk drive, with a preferred shockproof function within limited mechanical space.

Those skilled in the art will readily observe that numerous modifications and alterations of the device and method may be made while retaining the teachings of the invention.

What is claimed is:

1. A fixing mechanism for fixing an electronic module, comprising:
   a base whereon at least one buckling portion is formed;
   a bracket connected to the electronic module, the bracket comprising:
      a bottom plate fixed on a side of the electronic module;
      at least one lateral plate connected to the bottom plate and being buckled inside the buckling portion as the bracket is installed on the base; and
      a baffle connected to the bottom plate; and
   a cover portion installed on the base, the cover portion comprising:
      a board;
      at least one hook connected to a side of the board for hooking the base;
      a constraining portion connected to the side of the board for laterally constraining the at least one lateral plate; and
      a resilient structure connected to the constraining portion for contacting against the baffle of the bracket so as to support the electronic module resiliently.

2. The fixing mechanism of claim 1, wherein at least one hook structure is formed on an end of the at least one lateral plate for hooking the buckling portion.

3. The fixing mechanism of claim 1, further comprising a screwing component for screwing the bottom plate of the bracket on the side of the electronic module.

4. The fixing mechanism of claim 1, a buffer space is formed between the resilient structure and the board for allowing movement of the resilient structure pressed by the baffle.

5. The fixing mechanism of claim 1, wherein the cover portion further comprises an arc pad connected to another side of the board for supporting the base.

6. A computer device comprising:
   an electronic module; and
   a fixing mechanism for fixing the electronic module, comprising
      a base whereon at least one buckling portion is formed;
      a bracket connected to the electronic module, the bracket comprising:
         a bottom plate fixed on a side of the electronic module;

at least one lateral plate connected to the bottom plate and being buckled inside the buckling portion as the bracket is installed on the base; and a baffle connected to the bottom plate; and a cover portion installed on the base, the cover portion comprising:

a board;

at least one hook connected to a side of the board for hooking the base;

a constraining portion connected to the side of the board for laterally constraining the at least one lateral plate; and a resilient structure connected to the constraining portion for contacting against the baffle of the bracket so as to support the electronic module resiliently.

7. The computer device of claim 6, wherein at least one hook structure is formed on an end of the at least one lateral plate for hooking the buckling portion.

8. The computer device of claim 6, wherein the fixing mechanism further comprises a screwing component for screwing the bottom plate of the bracket on the side of the electronic module.

9. The computer device of claim 6, a buffer space is formed between the resilient structure and the board for allowing movement of the resilient structure pressed by the baffle.

10. The computer device of claim 6, wherein the cover portion further comprises an arc pad connected to another side of the board for supporting the base.

* * * * *